US008558658B2

(12) United States Patent
Kumar et al.

(10) Patent No.: US 8,558,658 B2
(45) Date of Patent: Oct. 15, 2013

(54) METHOD AND APPARATUS FOR CONFIGURING AN ACCESS CONTROL SYSTEM

(75) Inventors: Aneesh R Kumar, Bangalore (IN); Arunachalam K Sundararaman, Bangalore (IN); Nithyanandhan G Govindaraj, Bangalore (IN); Vinay V Venkatesh, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 822 days.

(21) Appl. No.: 12/630,082

(22) Filed: Dec. 3, 2009

(65) Prior Publication Data

US 2011/0133884 A1 Jun. 9, 2011

(51) Int. Cl.
*G05B 19/02* (2006.01)

(52) U.S. Cl.
USPC ............. 340/4.3; 340/3.1; 340/506; 717/120; 717/174

(58) Field of Classification Search
USPC ............................... 717/168, 170–173; 713/1
See application file for complete search history.

(56) References Cited

U.S. PATENT DOCUMENTS

| | | | | |
|---|---|---|---|---|
| 3,537,409 | A * | 11/1970 | Farley, Jr. | 109/19 |
| 4,689,610 | A * | 8/1987 | Dietrich | 340/515 |
| 6,066,182 | A * | 5/2000 | Wilde et al. | 717/175 |
| 2003/0036876 | A1* | 2/2003 | Fuller et al. | 702/127 |
| 2004/0148197 | A1* | 7/2004 | Kerr et al. | 705/2 |
| 2005/0260973 | A1* | 11/2005 | van de Groenendaal | 455/411 |
| 2006/0187034 | A1 | 8/2006 | Styers et al. | |
| 2007/0219645 | A1 | 9/2007 | Thomas et al. | |
| 2007/0252001 | A1 | 11/2007 | Kail et al. | |
| 2007/0268145 | A1* | 11/2007 | Bazakos et al. | 340/573.1 |
| 2009/0282366 | A1 | 11/2009 | DeBlaey et al. | |

FOREIGN PATENT DOCUMENTS

| | | | |
|---|---|---|---|
| EP | 2 003 620 | A2 | 12/2008 |
| EP | 2 003 620 | A3 | 11/2009 |
| WO | WO 2008/144803 | A1 | 12/2008 |
| WO | WO 2008/157755 | A1 | 12/2008 |
| WO | WO 2010/106474 | A1 | 9/2010 |

OTHER PUBLICATIONS

Great Britain's Intellectual Property Office's Mar. 25, 2011 Search Report under Seciton 17 corresponding to Application No. GB1020242.2.

Great Britain's Intellectual Property Office's Mar. 28, 2011 Combined Search and Examination Report under Sections 17 & 18(3) corresponding to Application No. GB1020242.2.

(Continued)

*Primary Examiner* — Daniel Wu
*Assistant Examiner* — Frederick Ott
(74) *Attorney, Agent, or Firm* — Husch Blackwell LLP

(57) ABSTRACT

A method and apparatus is provided for configuring a security system. The method includes the steps of providing a plurality of configuration files on a computer readable medium where each configuration file defines an access control system or integrated security system and each configuration file is different than any other configuration file of the plurality of configuration files, presenting the plurality of configuration files to a person on a display, a configuration processor receiving a selection of a configuration file of the plurality of configuration files from the person and the processor automatically configuring an access control system or integrated security system in accordance with the selected configuration file.

20 Claims, 2 Drawing Sheets

(56) References Cited

OTHER PUBLICATIONS

Great Britain's Intellectual Property Office's May 1, 2012 Examination Report Under Section 18(c) corresponding to Application No. GB1020242.2.

Great Britain's Intellectual Property Office's Feb. 21, 2013 Examination Report under Sectin 18(3) corresponding to Application No. GB1020242.2.

* cited by examiner

METHOD AND APPARATUS FOR CONFIGURING AN ACCESS CONTROL SYSTEM

FIELD OF THE INVENTION

The field of the invention relates to security systems and more particularly to the set up of security systems.

BACKGROUND OF THE INVENTION

Security systems are generally known. Such systems are typically used to protect persons and/or property within a secured area from external threats.

Most security systems typically employ some sort of perimeter protection (e.g., a wall) extending around the secured area with one or more access points. The access points may also include some sort of physical barrier (e.g., a door) along with an access controller (e.g., a lock).

The doors associated with the access points may also include one or more sensors that detect opening of the doors. Also associated with at least one of the access points may be a control panel for activating and deactivating the security system. The sensors located at the access points and the control panel may be connected to an alarm panel within the secured area.

Once activated, the alarm panel may monitor the sensors for intruders. Once a sensor is activated, the alarm panel may report the intrusion, immediately, to a central monitoring station. Alternatively, the alarm panel may wait a predetermined time period for entry of a deactivating code through the control panel.

While security systems are effective, they are sometimes difficult and time consuming to set up. Often times, the secured area may include many different security zones. In some cases, one or more of the security zones may be located within other security zones.

Moreover, access to the different security zones may be subject to a number of different criteria. For example, in some cases, the presence of more than one person may be needed to access the zone. Because of the importance of security systems, a need exists for better methods of setting up such systems.

DETAILED DESCRIPTION OF AN ILLUSTRATED EMBODIMENT

Figure 1:
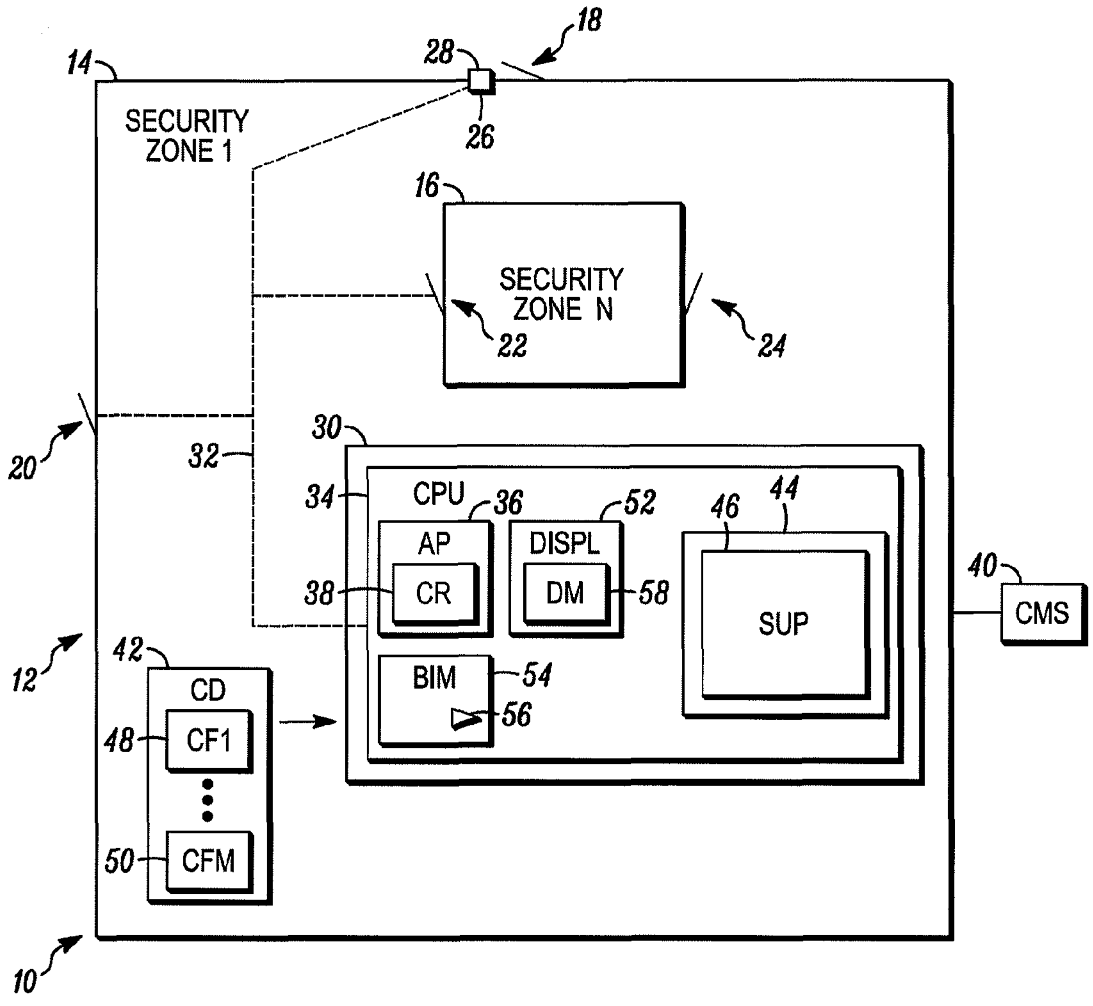
FIG. 1 is a block diagram of a security system shown generally in accordance with an illustrated embodiment of the invention.

FIG. 1 is a simplified block diagram of a security system 10 shown generally in accordance with an illustrated embodiment of the invention. The security system 10 may be used to protect a secured area 12.

The secured area 12 may include a number of security zones 14, 16. At least one of the security zones 16 may be located within another security zone 14 and only be accessible through the other security zone 14.

Located along a periphery of the secured area 12 and each of the security zones 14, 16 may be a number of closable access openings 18, 20, 22, 24, 24 that are secured through the use of a moveable member (e.g., door, window, etc.). The access doors may be used for the entry or egress of people and/or assets.

The state of each of the access opening (open or closed) is determined by a suitable sensor (e.g., door switch, magnetic sensor, etc.) 26. Also associated with at least some of the access openings may be an identification reader (e.g., a card reader, keypad, fingerprint or iris scanner, etc.) 28.

The one or more identification readers may be located inside the secured area or zone in the case where the access opening is secured by a door and key and lock combination. In this case an authorized person may use the key to open the door and enter a code to disable the alarm system.

Alternatively, the access openings may be secured by an electrically operable lock and be provided with a card reader located outside of the secured area 12 or zones 12, 14. In this case, an authorized user may swipe an identification card through the card reader in order to activate the electrically operable lock thereby gaining access to the secured area or zone.

Control of the security system 10 may be accomplished through an alarm panel 30 located within the secured area 12. The alarm panel 30, in turn, may be connected to the sensors 26 and reader 28 through a communication link 32. The communication link 32 may be accomplished via a wired connection or via wireless transceivers.

Included within the alarm panel 30 is one or more central processing units (CPUs) 34. In use, the alarm panel 30 may be armed via a code entered through the identification reader 28 in the case where the identification reader 28 is a keypad or by a magnetic code on a card in the case where the identification reader 28 is a card reader.

The code is transferred to an alarm processor 36 within the CPU 34. The alarm processor 36 may compare the received code with a code reference 38. If the received code matches, the reference code 38, the alarm processor 36 may alternatively activate or de-activate the alarm.

Once the alarm is activated, the alarm processor 36 may monitor the sensors 28. When the alarm processor 36 detects activation of a sensor 28, the alarm processor 36 may activate an audible alarm and forward an alarm notification to a central monitoring station 40. The central monitoring station 40, in turn, may notify a private security service or a local police department.

Under illustrated embodiments of the invention, the alarm system 10 may be set up by loading a set of alarm applications from a computer readable medium 42 (e.g., a CD) inserted into a reader of the alarm panel 30. Once the medium 42 is loaded into the alarm panel 30, the CPU 34 may identify and load a set up program 46 into a computer readable medium (e.g., a memory) 44 of the CPU 34. Alternatively, the set up program may be loaded into a computer system that controls the behavior of a set of alarm panels 30. The computer system may download the configuration to the alarm panels based on the zones that the alarm panels may control. In addition, the alarm panels may delegate the decision making to the computer system in which case the computer system controls the sensors through the alarm panels.

In the case where the set up program 46 is loaded to the alarm panel 30, the CPU 34 may then execute the set up program to complete the set up of the security system 10 in accordance with any of a number of different security scenarios. For example, the security system 10 could be set up to operate under any of a number of different security environments. For example, a security system for a bank may require the presence of two authorized parties to open a vault. Similarly, an electrically operated lock on the vault may be software limited to allow operation only during specific time periods during a day and week.

Similarly, the security system 10 could be set up for use in a hospital. For example and as would be known to those of skill in the art, the operating theatres in a hospital are usually located adjacent intensive care units (ICUs) and require a higher level of security than other areas of the hospital. In this case, access to the operating theatres would be limited to surgeons and operating room nurses, but not to floor nurses or hospital administrators. Moreover, the individual operating theatres may be dedicated by specialty and only allow entrance by physicians and operating nurses practicing in that area. In order to allow for rapid access in medical emergencies, the security system of a hospital may allow the use of radio frequency identification (RFID) tags worn by personnel that may be read by a wireless identification reader.

Figure 2:
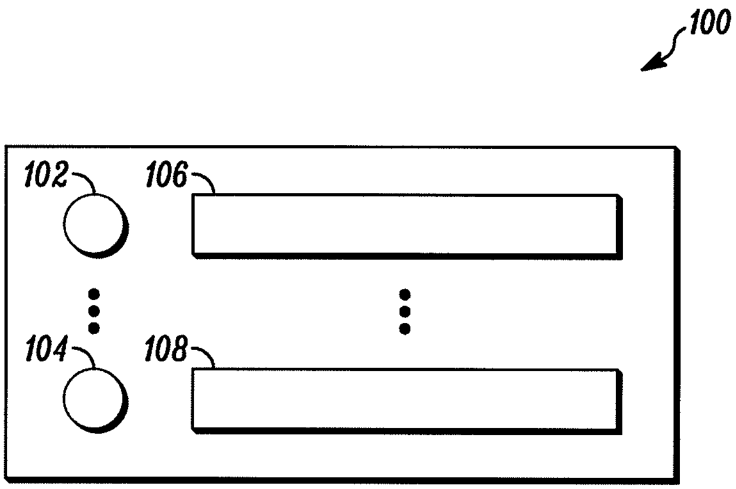
FIG. 2 is a screen display that may be used with the system of FIG. 1.

In order to facilitate set up of the security system, the set up program 46 (operating from within the alarm panel 30 or within a connected computer system) may present a set of options to a security technician that allows the security technician to easily configure the security system 10 to the environment of use. Under one illustrated embodiment, the set up program 46 may present the selection screen 100 of FIG. 2.

Located on the selection screen 100 on a display 52 (of the alarm panel 30 or a connected computer system) may be a selection icon 102, 104 for each respective type of security environment. Associated with each icon 102, 104 may be a text box 106, 108 that describes the security environment provided by activation of the selection icon 102, 104. Using the examples above, one of the text boxes 106, 108 may list and describe a bank environment and another box 106, 108 may list and describe a hospital environment.

Located within the CD 42 is a number of configuration files (1-M) 48, 50. Each of the configuration files 48, 50 may be associated with a respective icon 102, 104.

In general, the configuration files 48, 50 operates as a vertical template that defines a specific security system 10. The template is a vertical template because it defines the processing components and the interaction of those processing components between the sensor level and the zone access and alarm reporting level. For example, the hospital vertical template would have software components needed to build a hospital facility security system including reception, inpatient section, outpatient section, emergency room, patient wards, operating theatres, etc.

The individual software components of the templates of a configuration file 48, 50 may each be associated with a specific set of parameters. The sets of parameters may include hardware configuration, alarm configuration, security policies and compliances. Associated with each component may be a menu of options for optimizing the requirements of the end user.

The software components of the system 10 may be generated in any of a number of different ways. One way that this may be accomplished is by embedding the access openings 18, 20, 22, 22, 24 of the secured area 12 into an appropriate modeling system (e.g., Building Information Modeling (BIM), etc.). This has the advantage that the BIM model can be used to prepare the building's wiring system as well as set up the security system. Moreover, the BIM model provides a convenient source for depicting an overall structure of the secured area 12 and for the real time depiction of security events. This approach also contributes to the integration and real time depiction of the operation of other systems like HVAC, intrusion and video. Integrated systems can be visitor management systems, logical access systems (e.g., LDAP, HR systems, SAP, Peoplesoft, IDMS, etc.), process solutions, EPABX, elevator, fire systems, etc.). The overall result is the creation of a virtual infrastructure of the secured area 12 including access points 18, 20, 22, 24 onto a single canvas providing a user with 2-dimenional or 3-dimentional views of the entire area.

Upon activation of an icon 102, 104 by an alarm technician, the set up processor 46 loads the configuration file 48, 50 associated with the icon. Once the set up processor 46 has loaded the configuration file 48, 50 associated with the activated icon 102, 104, the set up processor 46 (or connected computer system) may begin to set up the software structures of the security system 10.

In this regard, the set up processor 46 may pose a sequence of questions to the alarm technician. The questions may relate to the secured area 12 as well as the regulatory environment in which the security system 10 will be used. For example, a first question posed via a YES/NO softkey to the technician may be whether the secured area 12 is to be set up for compliance with the Sarbanes-Oxley Act. Other questions (also answered via an appropriate YES/NO softkey) may relate to requirements of the Drug Enforcement Administration (DEA), North American Reliability Corporation (NERC) standard, the Northeastern Ecosystem Research Cooperative (NERC) and/or the Federal Energy Regulatory Commission (FERC).

On another more basic level, the set up processor 46 may pose a question requesting entry of the number of security zones to be provided within the secured area 12. Associated with the posed question may be an interactive window for entry of the number of security zones. Upon entry of the number of zones, the set up processor 46 may allocate a set of resources in accordance with the selected number.

For example, if the technician had selected the icon 102, 104 associated with a bank, then at least one of the zones would be associated with a vault. In this regard, the set up processor 46 may pose a question on the display 52 requesting that the technician identify one of the zones as being the vault. The configuration file 48, 50 may request this information because, vault access may require the presentation of identification from at least two persons in order to gain access to the vault. In this case, the configuration file may require that the access processor 36 implement a logical ANDing process of access credentials and that does not allow access to the vault except in the case of the concurrent presentation of identification from at least two authorized persons.

In this case, the set up processor 46 may identify the BIM model of the secured area 12 and present the technician with a layout of the secured area 12 on the display 52. The technician may select an identification tool 56 from the BIM model 54 and use the identification tool 56 to identify the zone 16 as being the vault. The technician may also use the tool 56 to identify the access openings 22, 24, the sensors 26 and identification readers 28 associated with the vault.

Similarly, the technician may identify the other security zones 14 of the secured zone 12. As the technician identifies each security zone 14, 16, the technician may also identify the access openings 18, 20, 22, 24, the sensors 26 and identification readers 28.

In general, the configuration files 48, 50 provide and are used to introduce a number of infrastructure templates into the security system 10. The templates consist of building blocks for that infrastructure. Each building block is ready to use with the hardware, alarm and policy configurations and compliances. The templates may be activated one at a time through use of the set up processor 46 and structured through the use of the BIM model 54. In this case, the set up processor 46 may depict a series of drop down menus over an image of the secured space 12. The technician may first select a menu item in a hierarchical order. For example, the technician may be asked to define a set of security zones 14, 16. The user may do this by dragging the selection tool 56 over a first area 12 to define a first zone. The user may then define a second zone 16 by similarly dragging the tool 56 over the second zone.

Next the technician may be asked to identify access openings 18, 20, 22, 24 for each previously defined zone 14, 16. In this case, the technician may first click on an access opening icon on a drop down menu. The technician may then select a sensor icon from a drop down menu and then click on a location of the sensor on an image of the zone 14, 16. The technician may then physically go to a location of the sensor within the secured area 12 and activate the sensor 26. Activation of the sensor 26 may cause the set up processor 46 to logically associate activation of the sensor 26 with the physical location of the sensor within the BIM model 54.

Similarly, the technician may select an identification reader 28. Once selected, the technician may swipe an identification card through the reader 28 to automatically associate the card with a security zone 14, 16 and with a security clearance.

Moreover, the security system 10 may be set up one zone at a time. In this case, the configuration present in one or more security zones can be exported to a computer readable medium and imported/applied to other zones.

A specific embodiment of method and apparatus for configuring a security system has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The configuration already present in one or more security zones can be exported to a computer readable format and imported/applied to another zone.

The invention claimed is:

1. A method comprising:

providing a plurality of configuration files on a computer readable medium where each configuration file defines an access control system and each configuration file is different than any other configuration file of the plurality of configuration files;

presenting the plurality of configuration files to a person on a display;

a configuration processor receiving a selection of a configuration file of the plurality of configuration files from the person;

a set up processor presenting a layout of the secured area to the person using a building information model, receiving through the presented layout an identification of a plurality of security zones within the secured area from the person, receiving notification of activation of at least one sensor in each of the plurality of security zones and logically associating the activated sensor with a physical location of the sensor within the building information model;

the configuration processor automatically configuring an access control system in accordance with the selected configuration file, the identified plurality of security zones, the at least one sensor in each of the plurality of security zones and the respective physical location of each of the sensors within the building information model wherein the automatically configured access control system further comprises an alarm processor that monitors the at least one sensor for activation by an intruder and forwards an alarm notification to a central monitoring station; and integrating the access control system with a logical access system using SAP software.

2. The method as in claim 1 wherein the configuring further comprises establishing a plurality of security zones within a secured area.

3. The method as in claim 2 wherein the plurality of security zones further comprise at least one security zone within another security zone.

4. The method as in claim 3 further comprising an access controller controlling access at an access opening into the other security zone.

5. The method as in claim 4 further comprising allowing access only upon detecting a predetermined plurality of persons at the access opening.

6. The method as in claim 5 further comprising defining the access opening as a bank vault.

7. The method as in claim 2 wherein the plurality of security zones further comprises accessing the second security zone only through the first security zone.

8. The method as in claim 7 further comprising defining the second security zone as an operating amphitheater and the first security zone as a hospital.

9. An apparatus comprising:

a plurality of configuration files on a computer readable medium where each configuration file defines an access control system and each configuration file is different than any other configuration file of the plurality of configuration files;

a display that presents the plurality of configuration files to a person;

a set up processor presenting a layout of the secured area to the person using a building information model, receiving through the presented layout an identification of a plurality of security zones within the secured area from the person, receiving notification of activation of at least one sensor in each of the plurality of security zones and logically associating the activated sensor with a physical location of the sensor within the building information model;

a configuration processor that receives a selection of a configuration file of the plurality of configuration files from the person and that automatically configures an access control system in accordance with the selected configuration file, the identified plurality of security zones, the at least one sensor in each of the plurality of security zones and the respective physical location of each of the sensors within the building information model;

an access control system configured by the configuration processor wherein the automatically configured access control system further comprises an alarm processor that monitors the at least one sensor for activation by an intruder and forwards an alarm notification to a central monitoring station; and integrating the access control system with a logical access system using SAP software.

10. The apparatus as in claim 9 further comprising a building information model that depicts a secured area protected by the access control system.

11. The apparatus as in claim 10 wherein the secured area further comprises a bank.

12. The apparatus as in claim 10 wherein the secured area further comprises a hospital.

13. The apparatus as in claim 10 further comprising a drop down menu that depicts a menu for designation of security zones within the secured area.

14. The apparatus as in claim 10 further comprising a drop down menu that depicts a menu for designation of sensors.

15. The apparatus as in claim 14 further comprising a selection tool that designates a location of a sensor.

16. The apparatus as in claim 13 wherein the secured area further comprises a plurality of security zones within a secured area.

17. The apparatus as in claim 16 wherein the plurality of security zones further comprise at least one security zone within another security zone.

18. An apparatus comprising:

means for providing a plurality of configuration files where each configuration file defines an access control system and each configuration file is different than any other configuration file of the plurality of configuration files;

means for displaying that presents the plurality of configuration files to a person;

means for receiving a selection of a configuration file of the plurality of configuration files from the person;

a set up processor presenting a layout of the secured area to the person using a building information model, receiving through the presented layout an identification of a plurality of security zones within the secured area from the person, receiving notification of activation of at least one sensor in each of the plurality of security zones and logically associating the activated sensor with a physical location of the sensor within the building information model;

means for automatically configuring an access control system in accordance with the selected configuration file, the identified plurality of security zones, the at least one sensor in each of the plurality of security zones and the respective physical location of each of the sensors within the building information model wherein the automatically configured access control system further comprises an alarm processor that monitors the at least one sensor for activation by an intruder and forwards an alarm notification to a central monitoring station; and integrating the access control system with a logical access system using SAP software.

19. The apparatus as in claim 18 further comprising a building information model that depicts a secured area protected by the access control system.

20. The apparatus as in claim 19 further comprising means for designating sensors on a secured area provided by the building information model.

* * * * *